Jan. 20, 1959   F. G. HUTCHENS   2,869,575
FLUID PRESSURE REGULATOR
Filed June 9, 1954   3 Sheets-Sheet 1
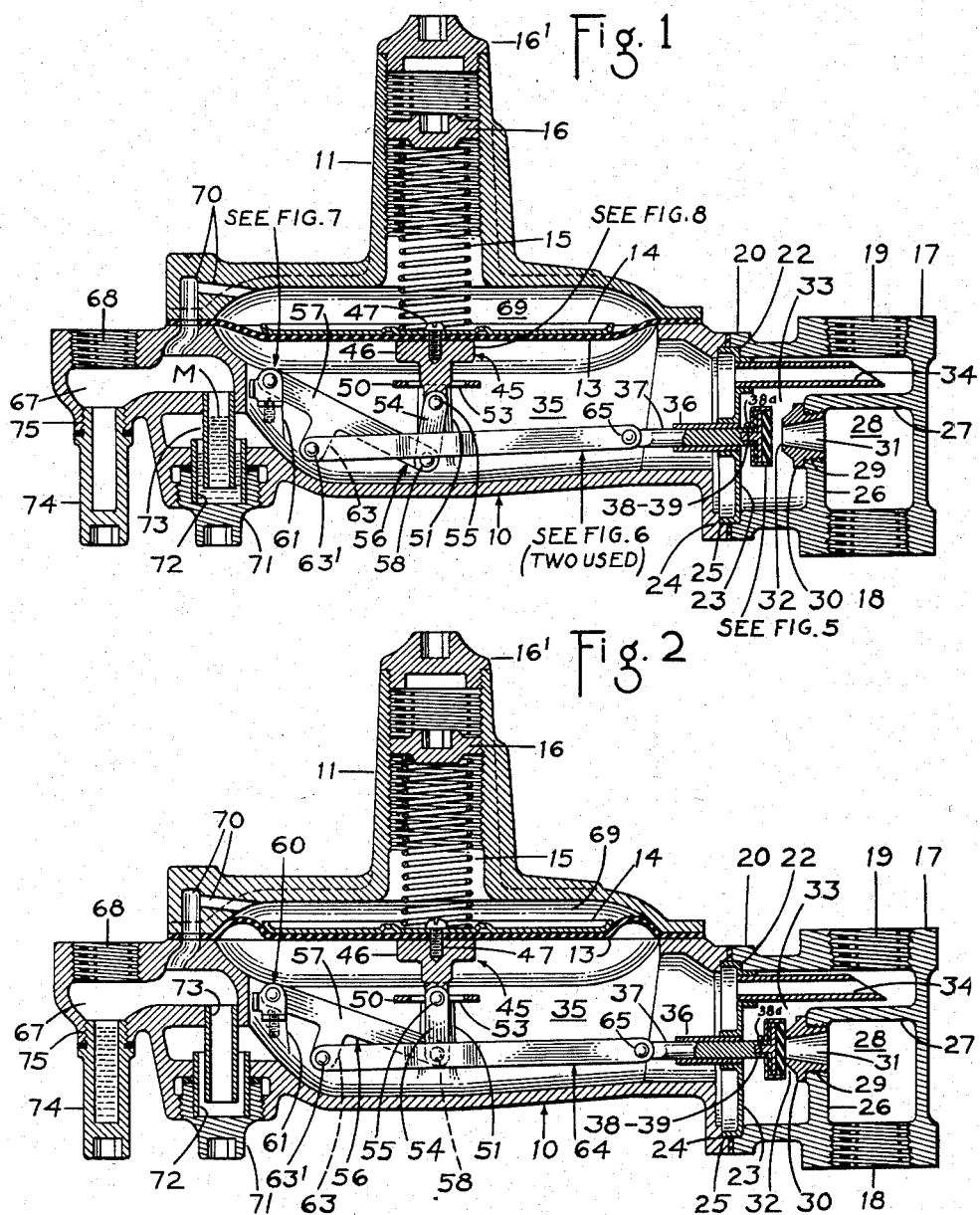
Francis G. Hutchens
INVENTOR.
BY G. Lorenze Miller
ATTORNEY

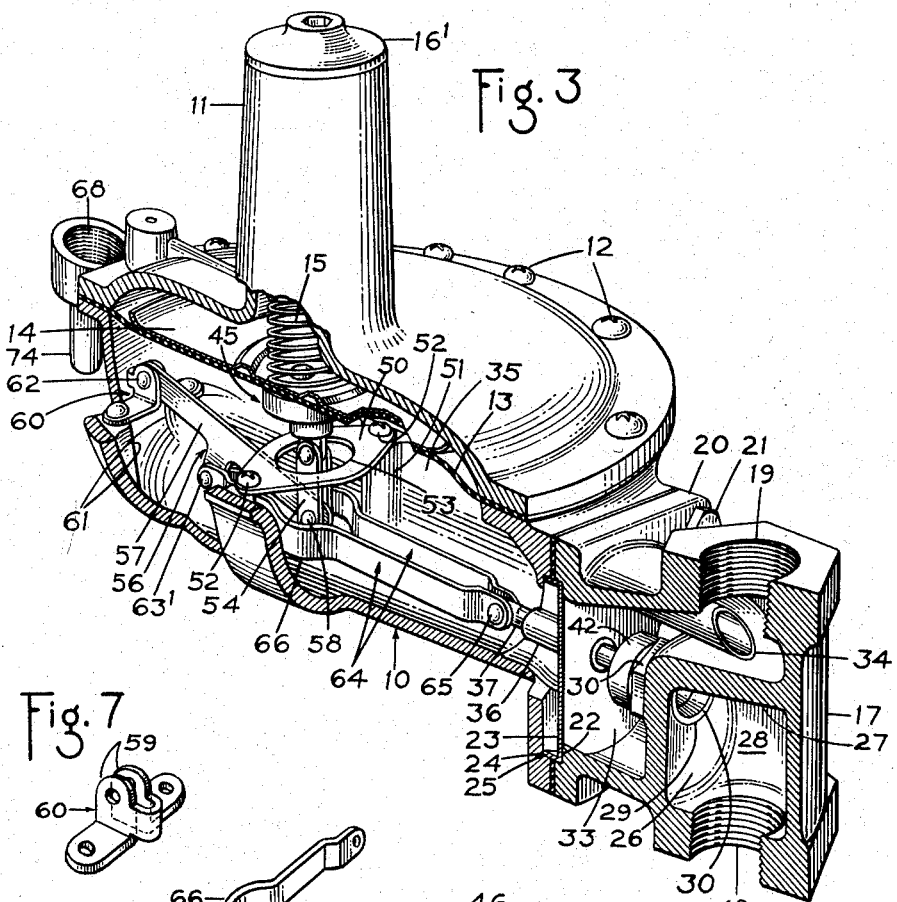
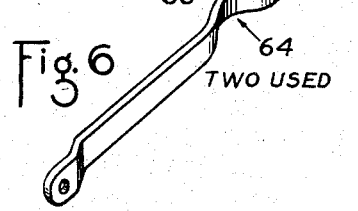
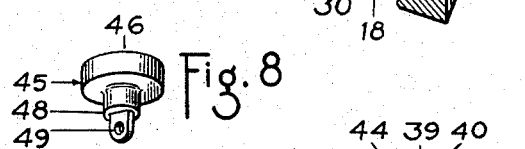
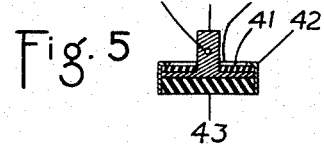

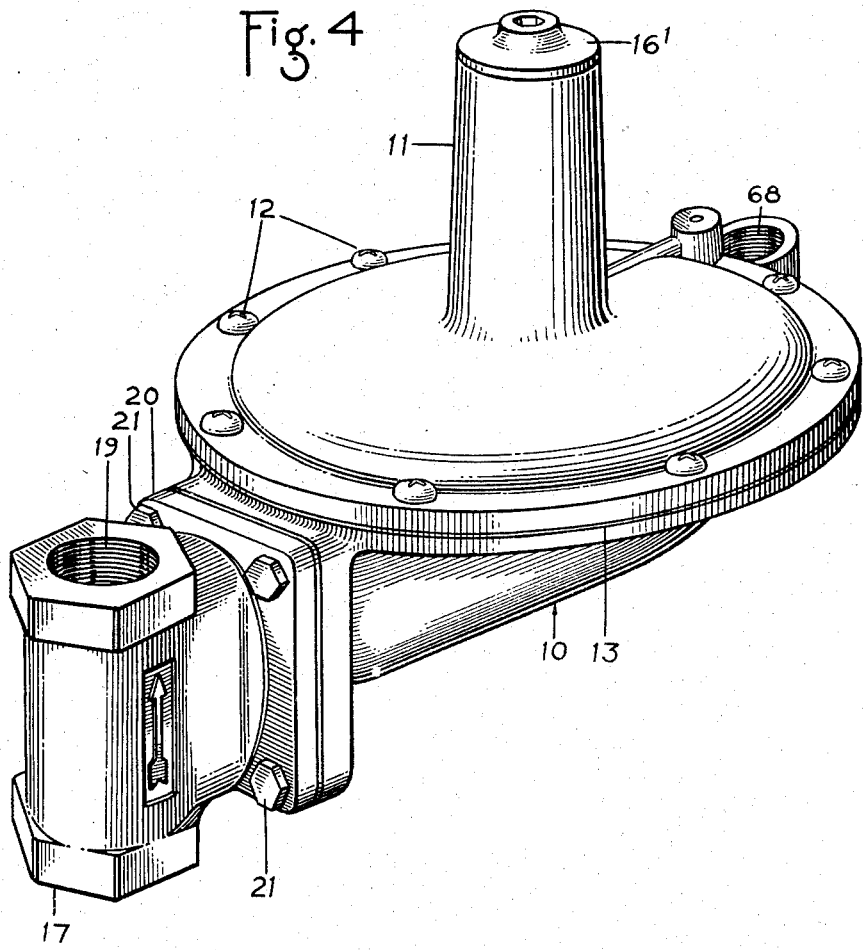

2,869,575
FLUID PRESSURE REGULATOR

Francis G. Hutchens, Anderson, Ind.

Application June 9, 1954, Serial No. 435,438

1 Claim. (Cl. 137—251)

This invention relates to a fluid pressure regulator.

A primary object of the invention is to provide a regulator for incorporation in a line conveying variable pressure fluid to utilities whereby a predetermined constant pressure may be established within the utilities.

A further object of the invention is to provide a fluid pressure regulator which incorporates a safety means in the form of a fluid-by-pass rendered operative upon excess pressure due to improper valve seating.

A still further object of the invention is to provide a fluid pressure regulator comprising a mercury sealed fluid by-pass including vertically disposed mercury retaining means and wherein provision is made for various angular dispositions of the inlet and outlet connections to the regulator for convenience in assembly without disturbing the required vertical position of the mercury retaining means.

Other objects and advantages of the invention will become apparent in the course of the following detailed description, taken in connection with the accompanying drawings, wherein—

Fig. 1 is a longitudinal vertical sectional view of the improved regulator in a preferred structural embodiment thereof, and showing the valve in open position for flow of fluid therethrough.

Fig. 2 is a view corresponding to Fig. 1 but showing the valve in closed or seated position.

Fig. 3 is a view showing a half longitudinal section of the regulator in perspective.

Fig. 4 is a perspective view of the complete regulator.

Fig. 5 is a diametrical sectional view of the valve structure.

Fig. 6 is a perspective view of a lever arm embodied in the construction.

Fig. 7 is a perspective view of a pivot bracket embodied in the construction.

Fig. 8 is a perspective view of a diaphragm and lever connecting member.

Referring now in detail to the drawings, 10 designates a main elongated housing which is surmounted by a circular spring housing 11 whose margin is secured to the main housing by screws 12 and between which is clamped the margin of a flexible diaphragm 13.

A plate 14 is engaged with the upper face of the diaphragm 13 and which is engaged centrally thereof by the lower end of an adjustable loading spring 15 disposed within housing 11 and whose upper end is engaged by a spring compression adjusting plug 16 having threaded engagement with the inner wall of housing 11 and the upper end of housing 11 is normally closed by a threaded closure cap 16¹ whereby the adjusting plug is normally concealed.

The structure embodies a third housing 17 which is provided with fluid inlet and outlet openings 18 and 19 respectively.

The housing 17 communicates with the adjacent end of housing 10 and embodies a square flanged base 20 releasably engageable with a correspondingly shaped end on housing 10 to which said base is secured by four bolts 21 equally spaced about the perimeter of said base whereby the housing 17 may be secured to housing 10 in four different right angularly disposed positions thereby facilitating the installation of the regulator under various prevailing circumstances.

The base 20 is provided with a circular recess 22 in which is supported a valve stem guide plate 23 for rotation with the housing 17 and which plate is provided with an inwardly directed flange 24 which is rotatably supported within a cylindrical wall 25 on the adjacent end of main housing 10.

The housing 17 is provided with a vertical internal wall 26 and a horizontal wall 27 extending from the upper edge of wall 26 to the outer end wall of housing 17 thereby providing a chamber 28 with which the inlet opening is in communication.

The wall 26 is provided with a threaded aperture 29 in which is removably threaded the shank of a valve seat member 30 having an orifice 31 whose axis is aligned with the axis of the valve stem guide plate 23 and the said seat member provides a circular valve seat 32 in encircling relation to the orifice 31. The said walls 26 and 27 in co-operation with the valve stem guide plate 23 provides a chamber 33 which includes a portion outwardly of wall 27 in communication with the outlet opening 19.

A pressure control tube 34 has one end thereof extending through the valve stem guide plate for communication with the chamber 35 in housing 10 and the other end of the tube is bevelled and communicates with the chamber 33 intermediate wall 27 and the outlet opening 19.

The guide plate 23 is provided centrally thereof with a valve stem bushing 36 whose axis is aligned with the axis of the orifice 31.

The above described construction provides for various angular positions of housing 17 relative to housing 10 while maintaining communication between the tube 34 and chamber 35 due to the provision of flange 24 on the valve stem guide plate 23.

Slidably disposed within the bushing 36 is a valve stem 37, one end of which projects into chamber 33 while the other end thereof projects into chamber 35. The said first end of the stem is provided with a recess 38 into which is fitted the cylindrical projection 39 (Fig. 5) of a valve structure which includes a base 40, a resilient mounting member 41 intermediate the base and the stem 37, a cup 42 crimped over the resilient mounting member 41 and extending beyond the base and a valve seat engageable disc 43 disposed within the cup on the side of base 40 opposed to the mounting member 41.

The projection 39 may be removably retained in the recess 38 by a cotter pin 38a or the like extended through an aperture 44 in the projection 39 and aligned apertures in the wall of recess 38.

The diaphragm 13 and the valve stem 37 are connected by the following means: A member 45 (Fig. 8) includes a centrally tapped cylindrical portion 46 which engages the lower face of the diaphragm centrally thereof and the member 45 is secured to the diaphragm plate 14 by a screw 47 which extends through the diaphragm and into the tapped portion 46 of the member 45. The member 45 further includes an axial extension 48 of portion 46 which terminates in an eye member 49.

A bridge plate 50 extends transversely of housing 10 and has its opposite ends secured to bosses 51 by means of screws 52. The bridge plate 50 is provided with an opening 53 of a diameter less than that of portion 46 and greater than that of extension 48 and through which the latter projects.

A pair of laterally spaced parallel links 54 have their upper ends in lapped relation to the tye member 49 and are pivotally connected thereto by a pin 55.

A lever 56 of generally T-form has one end of the head 57 thereof disposed between the lower ends of links 54 and pivotally connected thereto by a pin 58. The opposite end of head 57 is disposed between the ears 59 of a bracket 60 (Fig. 7) secured to bosses 61 and the said head is pivotally connected to the ears by a pin 62.

The free end of the stem 63 of the T-form lever is disposed between adjacent ends of arms 64 and secured thereto by a pin 63¹. The opposite ends of the arms are pivotally connected to the valve stem 37 by a pivot pin 65.

Since the arms 64 are disposed on opposite sides of links 54, same are outwardly bowed as at 66 for clearance of the links. The movements of the linkage above described may be readily visualized upon inspection of Figs. 1 and 2, in the former of which the valve is open for fluid flow through the regulator and in which condition the links 54 are inclined to the vertical and in the latter of which the valve is closed and the said links are substantially vertically disposed.

The improved regulator includes safety means whereby undue pressure in chamber 35 and accordingly in utilities in communication therewith is avoided. Such safety means comprises a chamber 67 in the opposite end of the housing 10 and communicating with such chamber is a vent pipe receiving opening 68. Said chamber 67 is also in communication with the chamber 69 in housing 11 above the diaphragm 13 by means of a passage 70 for a purpose later referred to.

Removably threaded into the lower wall of housing 10 is a mercury cup 71 in which is supported a mercury well tube 72 and a mercury seal tube 73 of less diameter than the well tube 72 is supported co-axially thereof with its lower end disposed within the well tube in spaced relation to the lower end thereof and having its upper end in communication with the chamber 67.

The chamber 35 in housing 10 extends around the tubes 72 and 73 and accordingly with no restriction within the tubes a by-pass passage between the chambers 35 and 67 is provided as is indicated by the arrows in Fig. 2.

The tubes are, however, normally supplied with a predetermined volume of mercury M (Fig. 1) whose weight restricts by passing of normal pressure within chamber 35.

Under excess pressure within chamber 35 however, the mercury M will be displaced and in order to conserve the relatively valuable mercury, a salvage cup 74 is provided and which includes a threaded open end portion 75 for ready connection to and disconnection from housing 10. It is to be observed that the bottom wall of chamber 67 slopes downwardly toward the upper open end of the salvage cup 74 whereby the mercury which is pressure displaced from tubes 72 and 73, as in Fig. 2, will unrestrictedly flow into the salvage cup 74.

It is to be observed that the valve seat member 30 is removably disposed within the angularly adjustable housing 17 which is readily removable thereby providing ready access to the valve member. It is of distinct advantage to have the valve seat member readily removable or replaceable for the reason that the orifice 31 in the seat member may vary in size according to inlet pressure used. The higher the inlet pressure the smaller the orifice may be to allow a given volume of fluid to flow through to the low pressure side.

The orifice is shaped on the lower pressure side to allow seating of the valve disc 43 to completely check the flow of fluid through the orifice.

The importance of the specific valve structure disclosed is set forth as follows: Due to the fact that natural gas is now being supplied to all parts of the country by pipe line, it has become necessary for utility companies to plan conversion programs as they contract for additional house heating load. This conversion is usually done during the summer months and it is desirable to have it completed before the heating season starts.

At the time of conversion the pressure in the street main is reduced to the lowest possible pressure, as many cuts into the main must be made under pressure. For this reason it is desirable to have a service regulator that may be loaded for a pressure and volume demanded by the consumer after the heating load is turned on.

In the meantime the service regulator must supply sufficient gas for the average summer time use, that is, all the gas appliances except heating load, with initial inlet pressures as low as six inches water column in some instances. The improved regulator herein disclosed satisfies the above noted conditions for the following reasons.

Assume the valve disc 43 to be in a flat position against the valve seat 30 at the lock-off position of Fig. 2. Upon a demand for gas flow, the valve moves away from the seat a distance to allow the required amount of gas to pass.

The first element of the valve structure contacted by the gas is the face of the valve disc 43. With the resilient mounting 40, the valve disc 43 retains its operative relation to the valve seat under all conditions of operation. With extremely low inlet pressure this condition is very important and is an advantage in any pressure range.

The link, lever and arm connection between the valve stem 37 and the diaphragm 13 possesses the following advantages: The power ratio is about three to eight, or, when the diaphragm moves upwardly under fluid pressure in chamber 35 one-half inch, the valve stem 37 with the valve moves forwardly three-sixteenths of an inch. However, the power exerted through the valve upon the valve seat is variable in relationship to the distance that it moves forward.

The mercury seal as above described provides a relief means for excessive pressure within the chamber 35 and the arrangement of the component elements thereof is such that the seal after having been blown can readily be restored by a service man who removes the mercury cup 71 and the mercury salvage cup 74 and then pours the salvaged mercury from the cup 74 into the cup 71 and restores the cups to their operative positions.

At this point it is to be noted that the provision of passage 70 provides for venting the chamber 69 after the mercury seal is blown.

It is to be further observed that plug 16, closure cap 16¹ and the cups 71 and 74 are all provided with polygonal tool receiving apertures whereby the regulator is capable of being serviced with a minimum number of tools.

Having set forth my invention in accordance with a preferred structural embodiment thereof, what I claim and desire to secure by U. S. Letters Patent is:

A pressure displaceable gravity operated fluid seal for use with a pressure regulating valve comprising, a housing in communication with a source of pressure fluid, a mercury cup removably supported in the bottom wall of said housing, a mercury well tube mounted in said cup, a mercury seal tube of less diameter than said first tube and having one end disposed therein in spaced relation to the bottom thereof, the opposite end of said mercury seal tube being in communication with a mercury well which through said first and second tubes is in communication with the fluid chamber within said housing, a vent opening to said mercury well and a volume of mercury disposed within the said tubes operative to support normal pressures within said housing chamber but capable of being discharged from the tubes upon excessive pressure in said chamber, and a mercury salvage cup removably engaged with the bottom wall of said housing and being in communication with said mercury well.

(References on following page)

References Cited in the file of this patent

UNITED STATES PATENTS

| | | |
|---|---|---|
| 1,166,027 | Weisgerber | Dec. 28, 1915 |
| 1,720,673 | Groble | July 16, 1929 |
| 1,851,598 | Smith | Mar. 29, 1932 |
| 1,931,777 | Thrall | Oct. 24, 1933 |
| 1,950,120 | McKee | Mar. 6, 1934 |
| 2,311,110 | Johnson | Feb. 16, 1943 |
| 2,347,586 | Whitworth | Apr. 25, 1944 |
| 2,536,370 | Hughes | Jan. 2, 1951 |
| 2,573,623 | Stover | Oct. 30, 1951 |
| 2,577,480 | Peterson | Dec. 4, 1951 |
| 2,619,983 | Roberts | Dec. 2, 1952 |